(12) United States Patent
Donderici

(10) Patent No.: US 12,399,798 B2
(45) Date of Patent: Aug. 26, 2025

(54) SELECTION OF RUNTIME PERFORMANCE ESTIMATOR USING MACHINE LEARNING

(71) Applicant: GM Cruise Holdings LLC, San Francisco, CA (US)

(72) Inventor: Burkay Donderici, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 333 days.

(21) Appl. No.: 17/961,390

(22) Filed: Oct. 6, 2022

(65) Prior Publication Data

US 2024/0118985 A1    Apr. 11, 2024

(51) Int. Cl.

| G06F 11/34 | (2006.01) |
|---|---|
| B60W 60/00 | (2020.01) |
| G06F 9/50 | (2006.01) |
| G06F 11/3604 | (2025.01) |
| G06N 20/00 | (2019.01) |

(52) U.S. Cl.
CPC ..... *G06F 11/3423* (2013.01); *B60W 60/0016* (2020.02); *G06F 9/505* (2013.01); *G06F 11/3612* (2013.01); *G06N 20/00* (2019.01)

(58) Field of Classification Search
CPC ............. G06F 11/3423; G06F 11/3447; G06F 11/3612; G06F 9/505; G06N 5/01; G06N 3/08; G06N 3/044; G06N 3/045; G06N 20/00; B60W 60/0016

USPC ......................................................... 702/182
See application file for complete search history.

(56) References Cited

U.S. PATENT DOCUMENTS

| 11,113,093 B2* | 9/2021 | Xu | G06F 11/301 |
|---|---|---|---|
| 11,681,544 B2* | 6/2023 | Xu | G06F 9/45558 |
| | | | 718/104 |
| 2023/0112004 A1* | 4/2023 | Hari | G06F 11/3457 |
| | | | 701/23 |
| 2023/0227071 A1* | 7/2023 | Donderici | B60W 50/06 |
| | | | 701/25 |

* cited by examiner

*Primary Examiner* — John H Le
(74) *Attorney, Agent, or Firm* — Honigman LLP; Matthew H. Szalach; Jonathan P. O'Brien

(57) ABSTRACT

Systems and techniques are provided for selecting a runtime performance estimator. An example method includes receiving, by a machine learning model, at least one compute workload and a target hardware parameter, wherein the target hardware parameter identifies one or more hardware components configurable to execute the at least one compute workload; identifying a plurality of runtime performance estimators for obtaining a predicted performance of the at least one compute workload on the one or more hardware components; determining a plurality of accuracy parameters and a plurality of cost parameters that are associated with the predicted performance obtained from the plurality of runtime performance estimators; and selecting, based on the plurality of accuracy parameters and the plurality of cost parameters, a preferred runtime performance estimator from the plurality of runtime performance estimators for obtaining the predicted performance of the at least one compute workload using the one or more hardware components.

14 Claims, 6 Drawing Sheets

SELECTION OF RUNTIME PERFORMANCE ESTIMATOR USING MACHINE LEARNING

BACKGROUND

1. Technical Field

The present disclosure generally relates to autonomous vehicles and, more specifically, to selecting an optimum runtime performance estimator for simulating autonomous vehicle workloads using a machine learning model.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
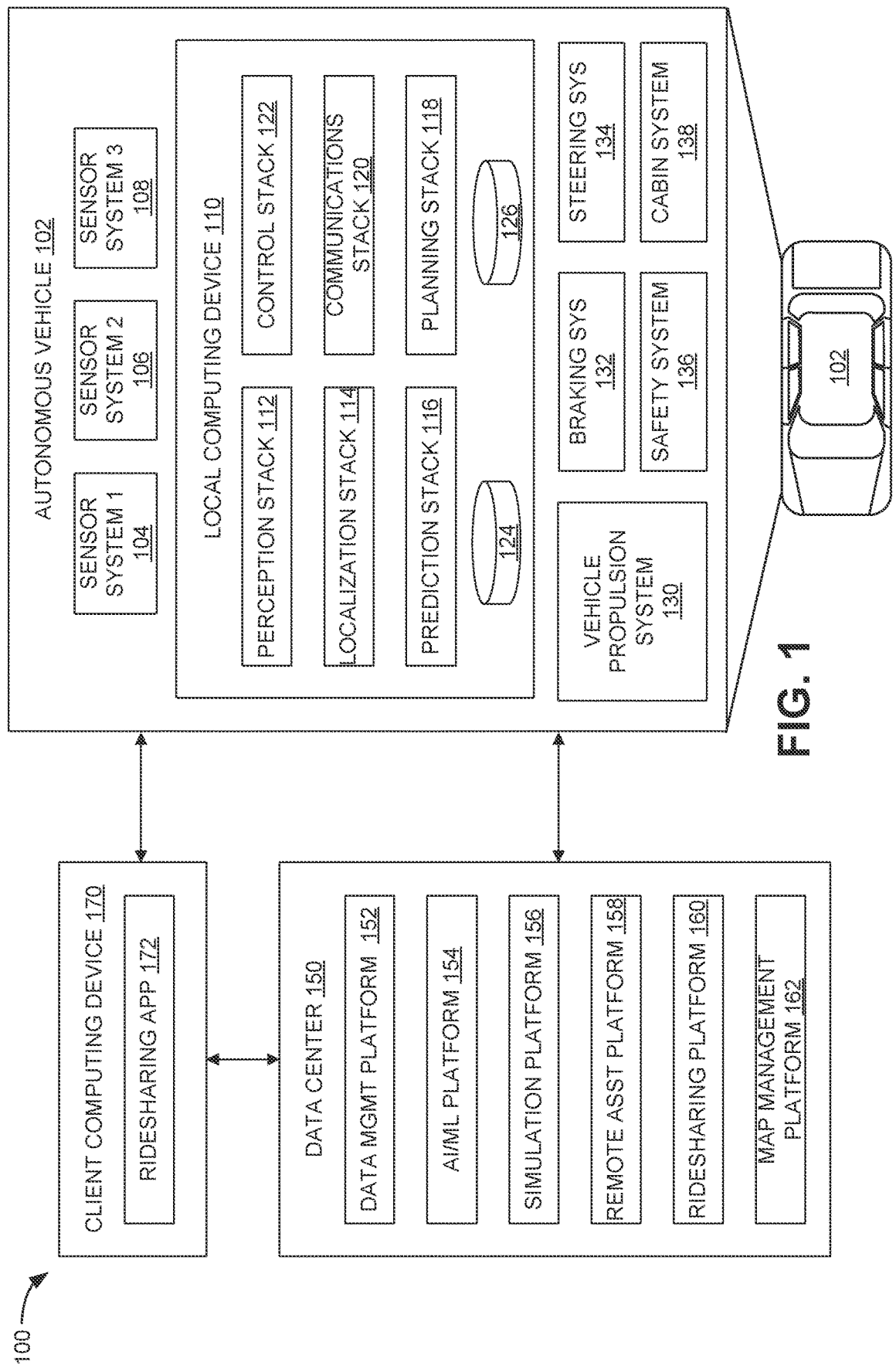
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. For example, AVs can include sensors such as a camera sensor, a LIDAR sensor, and/or a RADAR sensor, amongst others, which the AVs can use to collect data and measurements that are used for various AV operations. The sensors can provide the data and measurements to an internal computing system of the autonomous vehicle, which can use the data and measurements to control mechanical systems of the autonomous vehicle, such as a vehicle propulsion system, a braking system, and/or a steering system, etc.

The runtime performance of AV software is important because it can directly impact safe operation of the AV. For example, a large, unexpected latency in the processing of AV sensor data can result in a vehicle collision. Furthermore, measuring runtime performance of AV software may be untenable because of the cost as well as the risk associated with identifying a runtime issue using a physical AV.

In some cases, runtime performance can be tested or estimated using one or more runtime performance estimators. However, the accuracy of runtime performance estimators can vary greatly based on factors such as the nature of the compute task, the target hardware configuration, etc. In addition, while some runtime performance estimators can yield higher accuracy, it is not desirable to run such estimators for every estimation because of the high cost (e.g., time, computing resources, etc.).

Systems and techniques are provided herein for selecting an optimum runtime performance estimator using a machine learning (ML) model. In some aspects, the ML model can receive a request for selecting a runtime performance estimator that includes a compute workload and a target hardware configuration for running the compute workload. In some cases, the ML model can estimate the accuracy and the cost associated with running different runtime performance estimators to test the requested configuration. Based on the accuracy and cost, the ML model can select an optimum runtime performance estimator. In some examples, the ML model can also determine a safety metric associated with each of the candidate runtime performance estimators. For example, the safety metric can provide an indication of the likelihood of violating an AV safety threshold due to inaccuracies associated with a respective runtime performance estimator.

FIG. 1 is a diagram illustrating an example autonomous vehicle (AV) environment 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some aspects, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 6.

Figure 2:
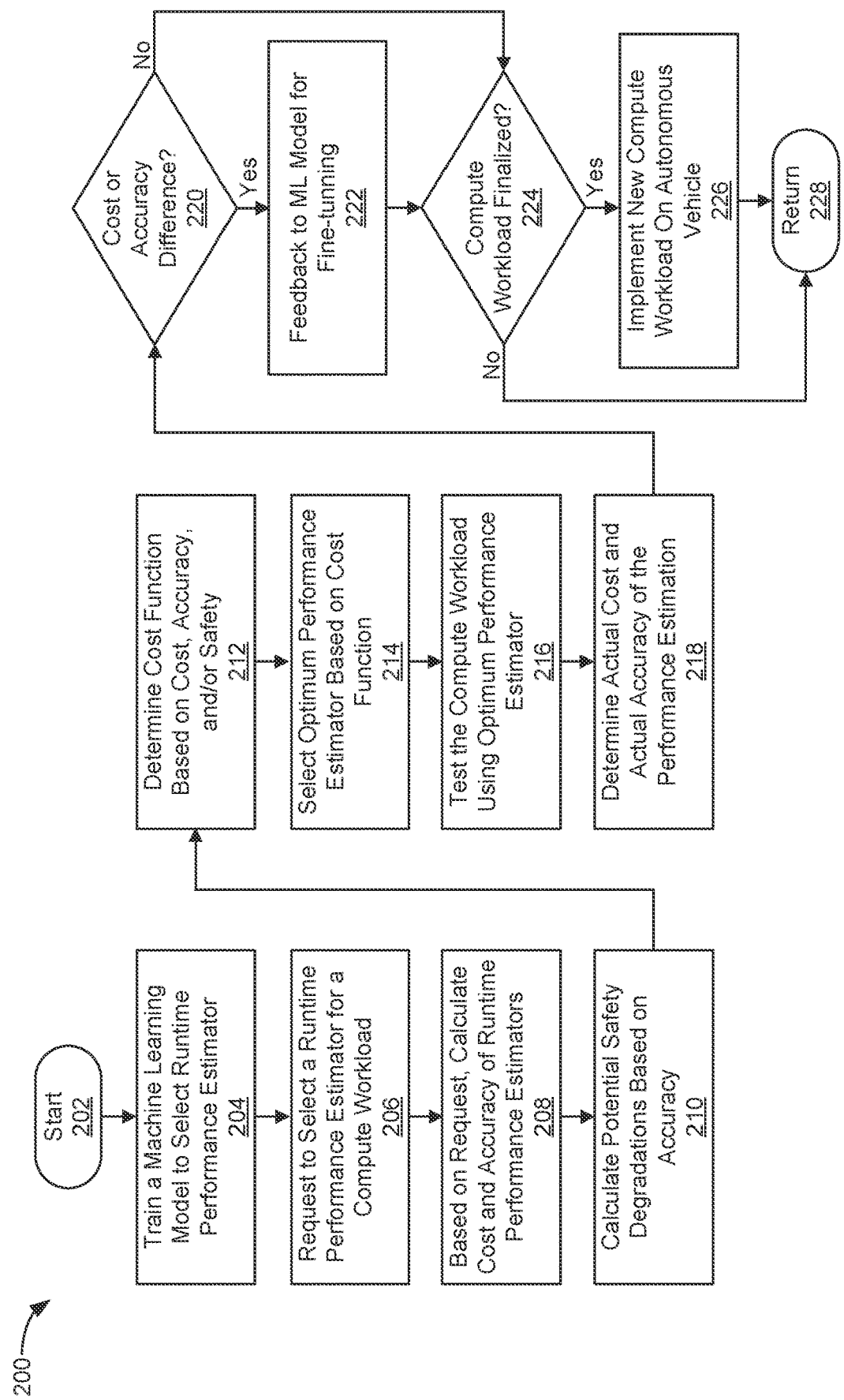
FIG. 2 is a flowchart diagram illustrating an example process for selecting a runtime performance estimator, in accordance with some examples of the present disclosure.

FIG. 2 is a flowchart diagram illustrating an example process 200 for selecting a runtime performance estimator using a machine learning model. In some aspects, process 200 may start at step 202, which may include initializing of hardware or software systems associated with an AV (e.g., AV 102) and/or with an AV simulation environment (e.g., simulation platform 156) or with any other computing device that may be configured to execute one or more steps in process 200.

In some examples, process 200 may include step 204 in which a machine learning (ML) model can be trained to select a runtime performance estimator. In some cases, the ML model can be trained using a training dataset that is created by running workloads (e.g., compute workloads) using one or more available runtime performance estimators. Examples of runtime performance estimators can include speed of light estimators, ML-based estimators, profiling estimators (e.g., profiling on approximate hardware and/or profiling on target hardware), simulators (e.g., analog simulation, digital simulation, bit-wise accurate simulation, etc.), and analytical projection estimators.

In some aspects, the training dataset can provide data that correlates the workloads with the runtime performance estimators and provides a corresponding accuracy metric and a cost metric for each. In some examples, the workloads can include a wide range of benchmarks such as neural networks having varying degrees of complexity (e.g., small or large number of layers, inputs, outputs, etc.) and/or any other software algorithms that may or may not be implemented using a neural network. In some cases, the accuracy data associated with the different runtime performance estimators can be absolute accuracy that is derived based on a comparison with actual performance using target hardware. In some examples, the accuracy data associated with the different runtime performance estimators can be relative accuracy (e.g., relative to each other using metric such as a percentage).

At step 206, the process 200 can include receiving a request to select a runtime performance estimator for a compute workload. In some cases, the compute workload can correspond to a machine learning model and/or a portion of a machine learning model. For instance, the compute workload can correspond to a portion of perception stack 112, prediction stack 116, and/or planning stack 118. In further examples, the compute workload can correspond to a Vision machine learning model, a LIDAR machine learning model, a RADAR machine learning model, a tracking machine learning model, a prediction machine learning model, a planning machine learning model, any portion thereof, and/or any combination thereof. In some cases, the request can identify a target hardware configuration for estimating the runtime performance. The target hardware configuration can correspond to central processing units (CPUs), graphical processing units (GPUs), custom accelerators (e.g., ML accelerators), digital signal processors (DSPs), and/or any other hardware component or configuration.

At step 208, the ML model can calculate cost and accuracy associated with the estimation using various runtime performance estimators. In some cases, the cost can include the time required to perform the estimation (e.g., number of milli-seconds (ms) to perform the estimation), the memory and/or computing resources needed to perform the estimation (e.g., number of bytes (b) to perform the estimation), and/or the number of mathematical operations associated with the estimation (e.g., number of floating-point operations (FLOPS) to perform the estimation).

At step 210, the ML model can calculate potential safety degradations associated with using each of the candidate runtime performance estimators. In some cases, the potential safety degradation can be based on the estimated accuracy of the respective runtime performance estimator. In some examples, the potential safety degradation can also be based on the nature of the compute workload that is being estimated. For example, a compute workload performed by the perception stack to identify a pedestrian that is in front of the AV may be associated with stricter safety thresholds (e.g., required compute time) then a workload associated with turning on the AV headlights in a dark environment. In some cases, a compute workload that is associated with a strict safety threshold may be more susceptible to inaccuracies of a runtime performance estimator.

In some aspects, the potential safety degradation may be calculated using a test set that is used to estimate the safety of the AV software stack (e.g., perception stack 112, prediction stack 116, planning stack 118, control stack 122, etc.). In some cases, the test set can include real test scenarios and/or simulated test scenarios. In some examples, the test set may be used to determine or identify AV response characteristics that are associated with unsafe and/or uncomfortable AV behavior (e.g., response characteristics can be used to identify anomalous AV behavior, potentially dangerous AV behavior, and/or low-comfort AV behavior). In some cases, a safety score may be determined (e.g., based on the test set) that is based on the percentage of test scenarios that satisfy safety criteria (e.g., safety threshold, safety parameter, expected safe behavior, etc.) that is associated with each test scenario.

At step 212, the ML model can determine a cost function for each of the candidate runtime performance estimators. In some cases, the cost function can be based on the cost of running the estimator, the accuracy of the estimator, and/or the safety parameters associated with the estimator. In some examples, the cost function can be a linear combination of the safety degradation parameter and the estimated cost (e.g., in some cases accuracy may be excluded from cost function as it may be inherently considered by the safety degradation parameter).

In some cases, each parameter in the cost function may be weighted. In some examples, the weights may be modified or calibrated based on historical data (e.g., based on prior estimations using the same or similar estimators and/or the same or similar compute workloads). In some aspects, the cost function may be presented as part of a user interface. In some cases, the user interface may allow a user to modify one or more parameters associated with the cost function and/or the request for a runtime performance estimator. For example, in a case in which cost of running the estimator is a primary concern (e.g., cost of the estimation is over budget), a relatively high weight may be used for the cost parameter in the cost function. In another example, the estimation may be under budget (e.g., cost of running the estimator is not a primary concern) and a relatively low weight may be assigned to the cost parameter in the cost function. In another example, the weight associated with accuracy parameter in the cost function may modified based on the sensitivity of the compute workload (e.g., a relatively high weight may be assigned when the compute workload is associated with a safety critical function in the AV). In some aspects, the weights of the parameters in the cost function may be adjusted to meet operational constraints (e.g., budget, time, accuracy, etc.).

At step 214, the ML model can select an optimum runtime performance estimator based on the cost function. For example, the ML model may select a runtime performance estimator having a high cost (e.g., long time for estimation, large number of hardware resources, etc.) based on a high accuracy requirement that may be dictated by the safety parameter(s). In some examples, the optimum runtime performance estimator may include multiple runtime performance estimators. For instance, the ML model may determine that two different runtime performance estimators are suitable. In some examples, the ML model may correspond to a classification model that may produce a score (e.g., based on a logit function) for each estimator. In some aspects, the estimator having the highest score may be selected as the optimum performance estimator.

At step 216, the estimation of the compute workload on the target hardware can be implemented using the optimum performance estimator identified by the ML model. In some aspects, the optimum performance estimator may execute using the same or different computing resources as the ML model that selects the optimum performance estimator.

At step 218, the actual cost and the actual accuracy of the runtime performance estimation can be determined. In some cases, the actual cost can correspond to the actual amount of time required to perform the estimation, the computing resources used by the estimation, the actual number of mathematical operations included in the estimation, etc. In some aspects, the actual accuracy can be relative to accuracy of other runtime performance estimators. In some cases, the actual accuracy can be based on a comparison of the estimation results to the results obtained from executing on the target hardware.

At step 220, the process 200 can include determining whether there is a difference between the actual cost and the predicted cost and/or whether there is a difference between the actual accuracy and the predicted accuracy. If a difference exists (e.g., a material difference or a difference that is greater than an allowable threshold), the process 200 can proceed to step 222 and the data can be provided as feedback to the machine learning model for further training and/or fine-tuning. If a difference does not exist or is negligible based on allowable threshold, the process 200 can proceed to step 224. In some aspects in which the difference is based on an allowable threshold, the threshold may be determined based on operational constraints. For example, the threshold can be based on the estimated cost of re-training the ML model (e.g., the ML model may be retrained or fine-tuned when the estimated cost of inaccuracy is greater than the estimated cost of re-training of fine-tuning the ML model). In some aspects, the difference between the actual cost and the predicted cost and/or the difference between the actual accuracy and the predicted accuracy may be determined and used to calibrate determination of the optimum estimator.

At step 224, the process 200 can include determining whether the compute workload has been finalized. For example, the compute workload may be finalized if the performance of the compute workload using the selected optimum runtime performance estimator yields favorable results (e.g., execution of the compute workload is completed within allowable or expected time). In some aspects, if the compute workload is finalized, the process 200 may proceed to step 226 in which the compute workload may be implemented on the autonomous vehicle. In some aspects, if the compute workload is not finalized, the process 200 may proceed to step 228 and return to prior processing, which may include repeating one or more steps from process 200 (e.g., modified compute workload may be submitted to ML model for selection of runtime performance estimator on same target hardware configuration, and/or unmodified compute workload may be submitted for selection of runtime performance estimator on a different target hardware configuration).

Figure 3:
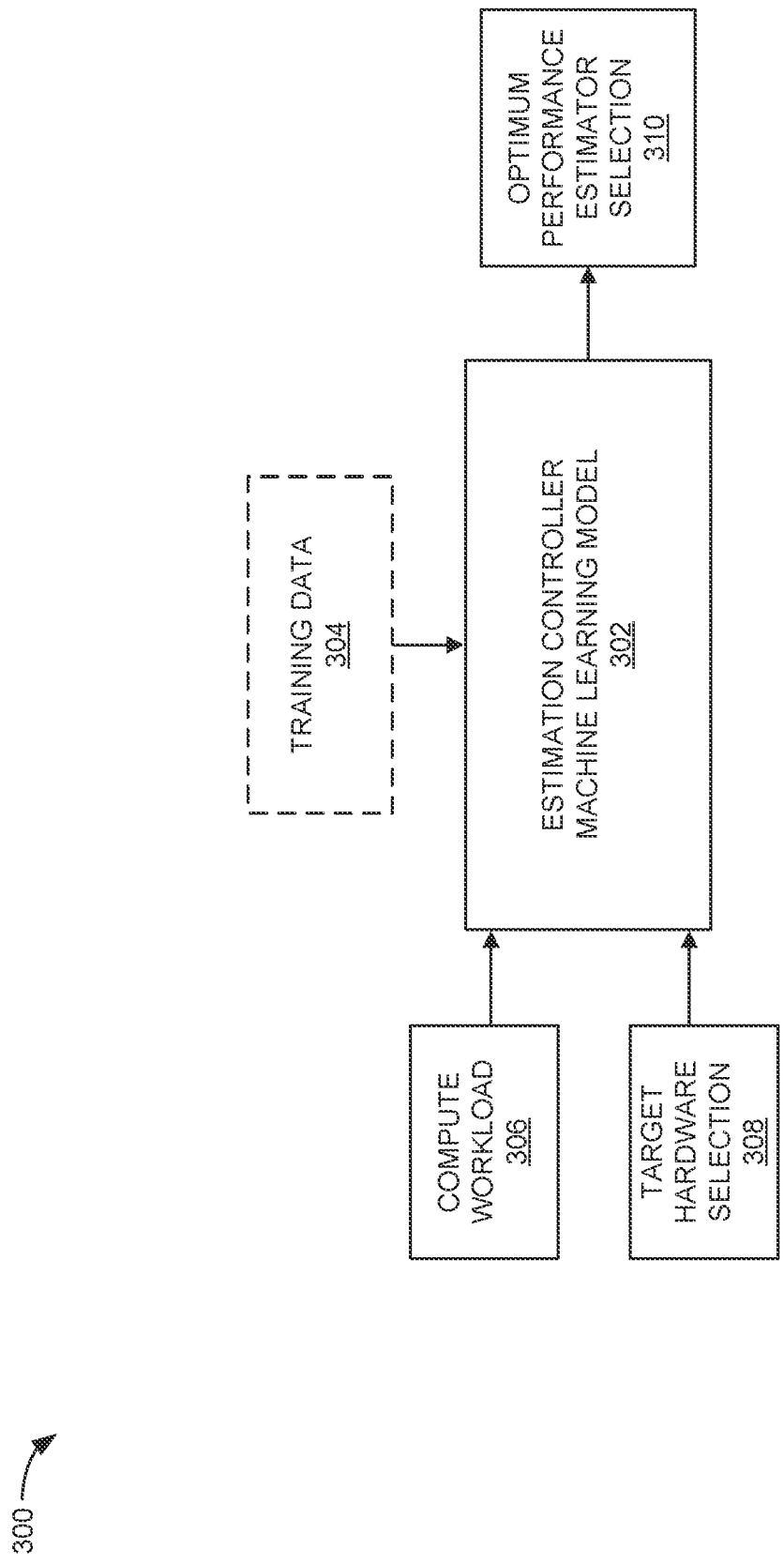
FIG. 3 is a diagram illustrating an example system for using a machine learning model to select a runtime performance estimator, in accordance with some examples of the present disclosure.

FIG. 3 illustrates an example system 300 for using a machine learning model to select a runtime performance estimator. In some aspects, system 300 may include estimation controller machine learning (ML) model 302. In some cases, estimation controller ML model 302 may include one or more components of processor-based system 600. In some examples, estimation controller ML model 302 can be configured to perform one or more steps of process 200 and/or process 500.

In some aspects, estimation controller ML model 302 may be trained to select an optimum runtime performance estimator using training data 304. In some examples, training data 304 can include data that correlates workloads (e.g., compute workloads, components of neural networks, software algorithms, compute graphs, etc.) with different runtime performance estimators and provides a corresponding accuracy metric and a cost metric for each.

In some cases, after the ML model is trained, estimation controller ML model 302 may receive a request for selecting an optimum runtime performance estimator. In some examples, the request may include compute workload 306 and target hardware selection 308. In some cases, compute workload 306 may correspond to one or more portions or components of software algorithms that are executed by an AV (e.g., AV 102). For instance, the compute workload 306 may correspond to portion of a neural network that is configured to operate as perception stack 112, control stack 122, prediction stack 116, planning stack 118, localization stack 114, communications stack 120, and/or any other software component associated with AV 102.

In some examples, estimation controller ML model 302 can use compute workload 306 and target hardware selection 308 to determine one or more parameters corresponding to one or more candidate runtime performance estimators. In some cases, the parameters can include a cost parameter, an accuracy parameter, and/or an AV safety parameter. In some aspects, estimation controller ML model 302 may configure a cost function using the one or more parameters. In some cases, estimation controller ML model 302 may select an optimum runtime performance estimator based on the cost function. In some instances, estimation controller ML model may output an indication of the optimum runtime performance estimator (e.g., optimum performance estimator selection 310). In some cases, estimation controller ML model 302 may be a classification model where each class corresponds to a different estimator selection. In some cases, estimation controller ML model 302 can execute and select the highest score (e.g., logit).

Figure 4:
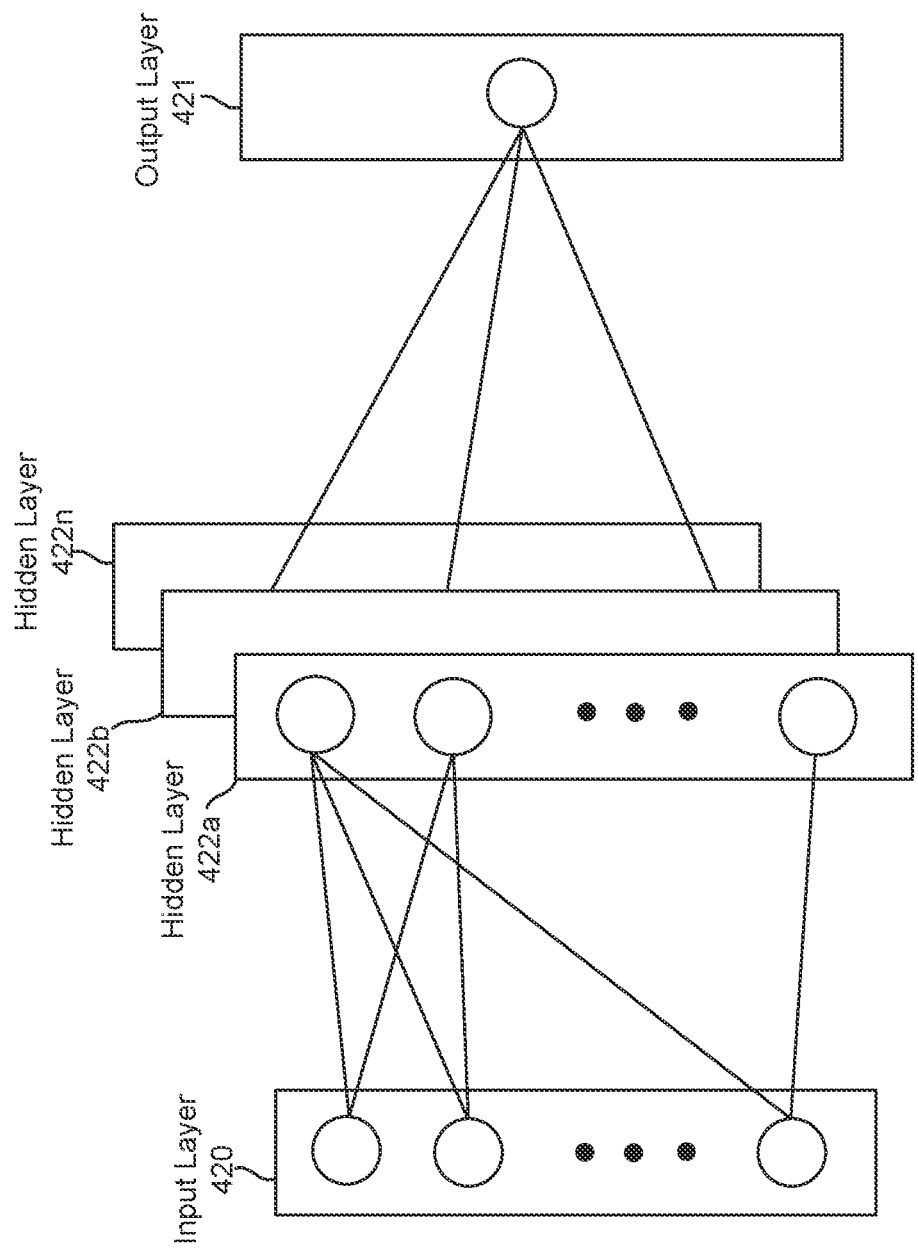
FIG. 4 illustrates an example of a deep learning neural network that can be used to implement aspects of runtime performance estimator selection, in accordance with some examples of the present disclosure.

In FIG. 4, the disclosure now turns to a further discussion of models that can be used through the environments and techniques described herein. FIG. 4 is an example of a deep learning neural network 400 that can be used to implement all or a portion of the systems and techniques described herein (e.g., neural network 400 can be used to implement a perception module (or perception system) as discussed above). An input layer 420 can be configured to receive a compute workload and a target hardware selection. The neural network 400 includes multiple hidden layers 422a, 422b, through 422n. The hidden layers 422a, 422b, through 422n include "n" number of hidden layers, where "n" is an integer greater than or equal to one. The number of hidden layers can be made to include as many layers as needed for the given application. The neural network 400 further includes an output layer 421 that provides an output resulting from the processing performed by the hidden layers 422a, 422b, through 422n. In one illustrative example, the output layer 421 can identify an optimum runtime performance estimator for simulating operation of the compute workload using the selected target hardware.

The neural network 400 is a multi-layer neural network of interconnected nodes. Each node can represent a piece of information. Information associated with the nodes is shared among the different layers and each layer retains information as information is processed. In some cases, the neural network 400 can include a feed-forward network, in which case there are no feedback connections where outputs of the network are fed back into itself. In some cases, the neural network 400 can include a recurrent neural network, which can have loops that allow information to be carried across nodes while reading in input.

Information can be exchanged between nodes through node-to-node interconnections between the various layers. Nodes of the input layer 420 can activate a set of nodes in the first hidden layer 422a. For example, as shown, each of the input nodes of the input layer 420 is connected to each of the nodes of the first hidden layer 422a. The nodes of the first hidden layer 422a can transform the information of each input node by applying activation functions to the input node information. The information derived from the transformation can then be passed to and can activate the nodes of the next hidden layer 422b, which can perform their own designated functions. Example functions include convolutional, up-sampling, data transformation, and/or any other suitable functions. The output of the hidden layer 422b can then activate nodes of the next hidden layer, and so on. The output of the last hidden layer 422n can activate one or more nodes of the output layer 421, at which an output is provided. In some cases, while nodes in the neural network 400 are shown as having multiple output lines, a node can have a single output and all lines shown as being output from a node represent the same output value.

In some cases, each node or interconnection between nodes can have a weight that is a set of parameters derived from the training of the neural network 400. Once the neural network 400 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 400 to be adaptive to inputs and able to learn as more and more data is processed.

The neural network 400 is pre-trained to process the features from the data in the input layer 420 using the different hidden layers 422a, 422b, through 422n in order to provide the output through the output layer 421.

In some cases, the neural network 400 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 400 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as E_total=Σ(½(target-output)^2). The loss can be set to be equal to the value of E_total.

The loss (or error) will be high for the initial training data since the actual values will be much different than the predicted output. The goal of training is to minimize the amount of loss so that the predicted output is the same as the training output. The neural network 400 can perform a backward pass by determining which inputs (weights) most contributed to the loss of the network, and can adjust the weights so that the loss decreases and is eventually minimized.

The neural network 400 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 400 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 5:
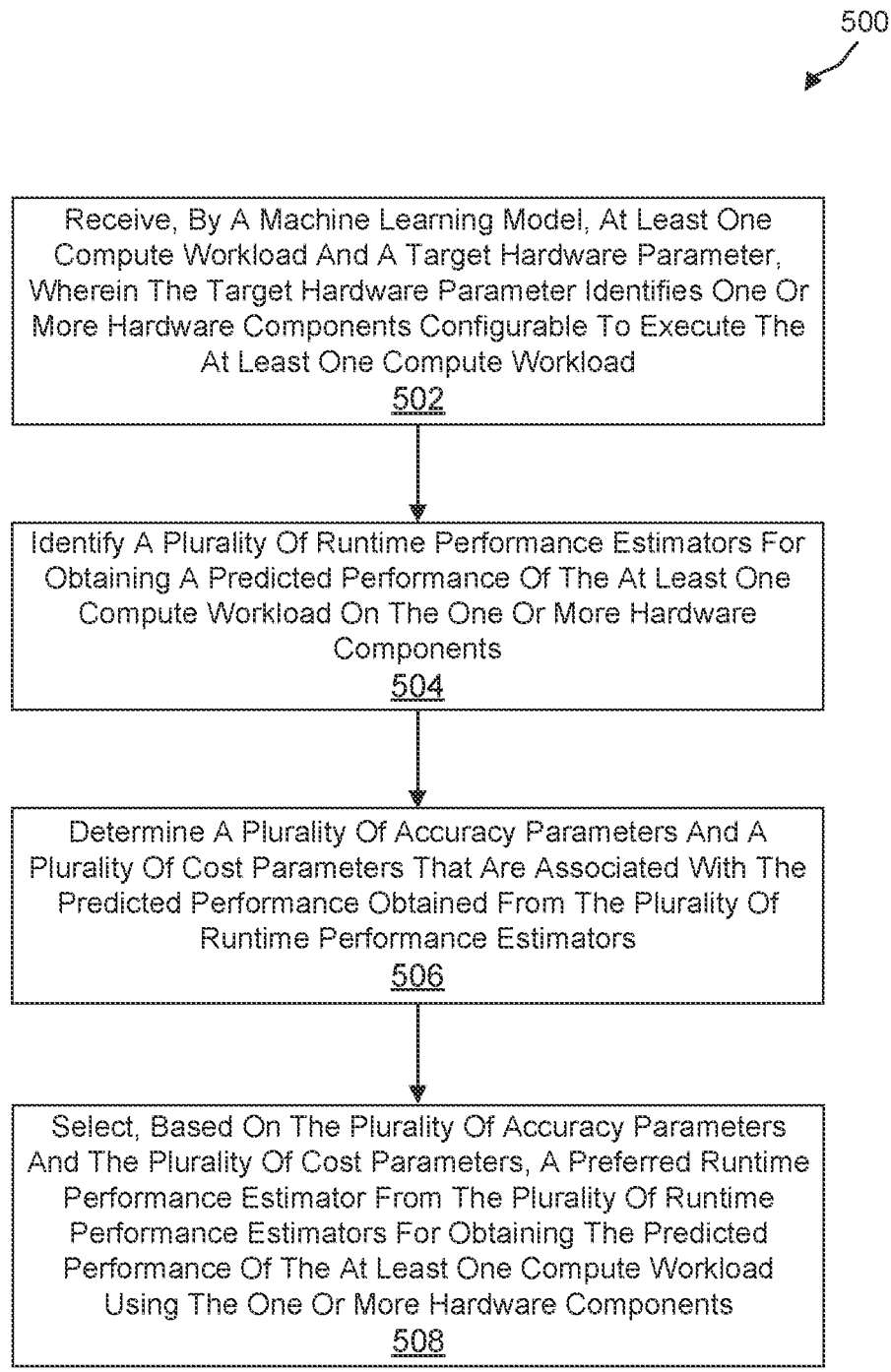
FIG. 5 is a flowchart illustrating an example process for selecting a runtime performance estimator, in accordance with some examples of the present disclosure.

FIG. 5 illustrates an example of a process 500 for selecting a runtime performance estimator. At block 502, the process 500 includes receiving, by a machine learning model, at least one compute workload and a target hardware parameter, wherein the target hardware parameter identifies one or more hardware components configurable to execute the at least one compute workload. For example, estimation controller machine learning (ML) model 302 can receive compute workload 306 and target hardware selection 308. In some aspects, the compute workload can include at least one of a compute graph, one or more neural network layers, and a neural network component. In some cases, the neural network component can include at least one of a perception stack component, a prediction stack component, a planning stack component, and a control stack component.

At block 504, the process 500 includes identifying a plurality of runtime performance estimators for obtaining a predicted performance of the at least one compute workload on the one or more hardware components. For example, estimation controller ML model 302 can identify a plurality of runtime performance estimators for estimating performance of compute workload 306 using the hardware identified by target hardware selection 308.

At block 506, the process 500 includes determining a plurality of accuracy parameters and a plurality of cost parameters that are associated with the predicted performance obtained from the plurality of runtime performance estimators. For instance, estimation controller ML model 302 can determine accuracy parameters and cost parameters associated with runtime performance estimation as performed by each of the candidate runtime performance estimators. In some examples, the plurality of cost parameters can be based on one or more of an estimated time, an estimated memory allocation, and an estimated number of mathematical operations. In some cases, the plurality of accuracy parameters is based on a relative accuracy among the plurality of runtime performance estimators. In some instances, the plurality of accuracy parameters corresponds to an absolute accuracy that is relative to execution on the one or more hardware components.

At block 508, the process 500 includes selecting, based on the plurality of accuracy parameters and the plurality of cost parameters, a preferred runtime performance estimator from the plurality of runtime performance estimators for obtaining the predicted performance of the at least one compute workload using the one or more hardware components. For example, estimation controller ML model 302 can use the cost parameters and the accuracy parameters to select an optimum runtime performance estimator as indicated by optimum performance estimator selection 310.

In some aspects, the process 500 can include determining an autonomous vehicle (AV) safety risk parameter, wherein the AV safety risk parameter corresponds to a likelihood of violating at least one AV safety threshold based on the plurality of accuracy parameters. For example, estimation controller ML model 302 can determine an AV risk parameter that corresponds to a likelihood of an AV (e.g., AV 102) violating an AV safety threshold based on the accuracy parameter.

In some cases, the process 500 can include determining a cost function for each of the plurality of runtime performance estimators, wherein the cost function is based on the AV safety risk parameter and the plurality of cost parameters. For instance, estimation controller ML model 302 can determine a cost function for each of the performance estimators that can be based on the cost parameters and the AV safety risk parameter.

In some examples, the process 500 can include receiving, by the machine learning model, feedback data associated with the predicted performance using the preferred runtime performance estimator, wherein the feedback data includes an actual estimation cost and an actual estimation accuracy and tuning the machine learning model based on the actual estimation cost and the actual estimation accuracy. For example, estimation controller ML model 302 can receive feedback that includes the actual cost and/or the actual accuracy of the runtime performance estimation performed using optimum performance estimator selection 310. In some cases, estimation controller ML model 302 can use the feedback data to further train or finetune (e.g., adjust one or more weights) the ML model.

Figure 6:
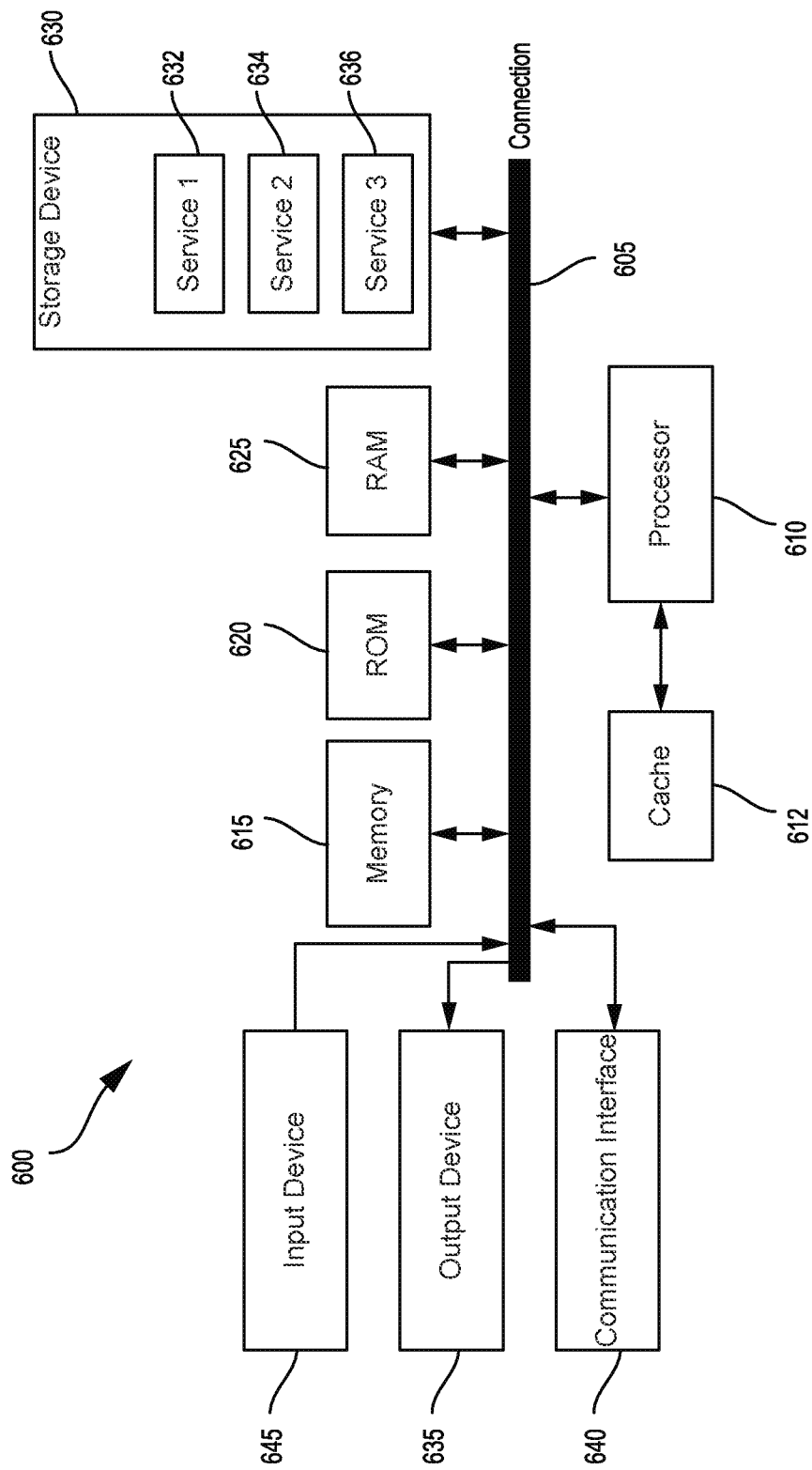
FIG. 6 is a diagram illustrating an example system architecture for implementing certain aspects described herein.

FIG. 6 illustrates an example processor-based system with which some aspects of the subject technology can be implemented. For example, processor-based system 600 can be any computing device making up internal computing system 110, a passenger device executing the ridesharing application 172, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some examples, computing system 600 is a distributed system in which the functions described in this disclosure can be distributed within a datacenter, multiple data centers, a peer network, etc. In some cases, one or more of the described system components represents many such components each performing some or all of the function for which the component is described. In some aspects, the components can be physical or virtual devices.

Example system 600 includes at least one processing unit (CPU or processor) 610 and connection 605 that couples various system components including system memory 615, such as read-only memory (ROM) 620 and random-access memory (RAM) 625 to processor 610. Computing system 600 can include a cache of high-speed memory 612 connected directly with, in close proximity to, and/or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 can include an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 630 can include software services, servers, services, etc., that when the code that defines such software is executed by the processor 610, causes the system to perform a function. In some examples, a hardware service that performs a particular function can include the software component stored in a computer-readable medium in connection with the necessary hardware components, such as processor 610, connection 605, output device 635, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

SELECTED EXAMPLES

Illustrative examples of the disclosure include:

Aspect 1. A method comprising: receiving, by a machine learning model, at least one compute workload and a target hardware parameter, wherein the target hardware parameter identifies one or more hardware components configurable to execute the at least one compute workload; identifying a plurality of runtime performance estimators for obtaining a predicted performance of the at least one compute workload on the one or more hardware components; determining a plurality of accuracy parameters and a plurality of cost parameters that are associated with the predicted performance obtained from the plurality of runtime performance estimators; and selecting, based on the plurality of accuracy parameters and the plurality of cost parameters, a preferred runtime performance estimator from the plurality of runtime performance estimators for obtaining the predicted performance of the at least one compute workload using the one or more hardware components Aspect 2. The method of Aspect 1, wherein the at least one compute workload includes at least one of a compute graph, one or more neural network layers, and a neural network component.

Aspect 3. The method of Aspect 2, wherein the neural network component includes at least one of a perception stack component, a prediction stack component, a planning stack component, and a control stack component.

Aspect 4. The method of any of Aspects 1 to 3, wherein the plurality of cost parameters is based on one or more of an estimated time, an estimated memory allocation, and an estimated number of mathematical operations.

Aspect 5. The method of any of Aspects 1 to 4, wherein the plurality of accuracy parameters is based on a relative accuracy among the plurality of runtime performance estimators.

Aspect 6. The method of any of Aspects 1 to 5, wherein the plurality of accuracy parameters corresponds to an absolute accuracy that is relative to execution on the one or more hardware components.

Aspect 7. The method of any of Aspects 1 to 6, further comprising: determining an autonomous vehicle (AV) safety risk parameter, wherein the AV safety risk parameter corresponds to a likelihood of violating at least one AV safety threshold based on the plurality of accuracy parameters Aspect 8. The method of Aspect 7, further comprising: determining a cost function for each of the plurality of runtime performance estimators, wherein the cost function is based on the AV safety risk parameter and the plurality of cost parameters.

Aspect 9. The method of any of Aspects 1 to 8, receiving, by the machine learning model, feedback data associated with the simulated execution using the preferred runtime performance estimator, wherein the feedback data includes an actual estimation cost and an actual estimation accuracy; and tuning the machine learning model based on the actual estimation cost and the actual estimation accuracy.

Aspect 10. The method of any of Aspects 1 to 9, wherein the preferred runtime performance estimator includes a combination of runtime performance estimators selected from the plurality of runtime performance estimators.

Aspect 110. An apparatus comprising: at least one memory; and at least one processor coupled to the at least one memory, wherein the at least one processor is configured to perform operations in accordance with any one of Aspects 1 to 10.

Aspect 12. An apparatus comprising means for performing operations in accordance with any one of Aspects 1 to 10.

Aspect 13. A non-transitory computer-readable medium comprising instructions that, when executed by an apparatus, cause the apparatus to perform operations in accordance with any one of Aspects 1 to 10.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   receiving, by a machine learning model, at least one autonomous vehicle (AV) compute workload including a workload criticality level and a target hardware parameter, wherein the target hardware parameter identifies one or more hardware components configurable to execute the at least one AV compute workload;
   identifying a plurality of runtime performance estimators for obtaining a predicted performance of the at least one AV compute workload on the one or more hardware components;
   for each runtime performance estimator of the plurality of runtime performance estimators:
      determining, by the machine learning model, a respective safety degradation metric by applying the runtime performance estimator to a test set of AV operational scenarios and comparing results against safety thresholds associated with the workload criticality level; and
      calculating, by the machine learning model, a cost function value based on the respective safety degradation metric; and
   selecting, by the machine learning model, a preferred runtime performance estimator from the plurality of runtime performance estimators that optimizes the cost function value for obtaining the predicted performance of the at least one AV compute workload using the one or more hardware components.

2. The method of claim 1, wherein the at least one AV compute workload includes at least one of a compute graph, one or more neural network layers, and a neural network component.

3. The method of claim 2, wherein the neural network component includes at least one of a perception stack component, a prediction stack component, a planning stack component, and a control stack component.

4. The method of claim 1, wherein the operations further comprise, for each of the plurality of runtime performance estimators, determining, by the machine learning model, a cost parameter associated with the predicted performance, each of the cost parameters based on one or more of an estimated time, an estimated memory allocation, and an estimated number of mathematical operations.

5. The method of claim 1, wherein the operations further comprise, for each of the plurality of runtime performance estimators, determining, by the machine learning model, an accuracy parameter associated with the predicted performance, each of the accuracy parameters based on a relative accuracy among the plurality of runtime performance estimators.

6. The method of claim 1, wherein the operations further comprise, for each of the plurality of runtime performance estimators, determining, by the machine learning model, an accuracy parameter associated with the predicted performance, each of the accuracy parameters corresponding to an absolute accuracy that is relative to execution on the one or more hardware components.

7. The method of claim 1, further comprising:
receiving, by the machine learning model, feedback data associated with the predicted performance using the preferred runtime performance estimator, wherein the feedback data includes an actual estimation cost and an actual estimation accuracy; and
tuning the machine learning model based on the actual estimation cost and the actual estimation accuracy.

8. An apparatus comprising:
at least one memory comprising instructions; and
at least one processor configured to execute the instructions and cause the at least one processor to:
receive, by a machine learning model, at least one autonomous vehicle (AV) compute workload including a workload criticality level and a target hardware parameter, wherein the target hardware parameter identifies one or more hardware components configurable to execute the at least one AV compute workload;
identify a plurality of runtime performance estimators for obtaining a predicted performance of the at least one AV compute workload on the one or more hardware components;
for each runtime performance estimator of the plurality of runtime performance estimators:
determine, by the machine learning model, a respective safety degradation metric by applying the runtime performance estimator to a test set of AV operational scenarios and comparing results against safety thresholds associated with the workload criticality level; and
calculate, based on the machine learning model, a cost function value based on the respective safety degradation metric; and
select, based on the machine learning model, a preferred runtime performance estimator from the plurality of runtime performance estimators that optimizes the cost function value for obtaining the predicted performance of the at least one AV compute workload using the one or more hardware components.

9. The apparatus of claim 8, wherein the at least one AV compute workload includes at least one of a prediction stack component, a planning stack component, and a control stack component.

10. The apparatus of claim 8, wherein the operations further comprise, for each of the plurality of runtime performance estimators, determining, by the machine learning model, a cost parameter associated with the predicted performance, each of the cost parameters based on one or more of an estimated time, an estimated memory allocation, and an estimated number of mathematical operations.

11. The apparatus of claim 8, wherein the operations further comprise, for each of the plurality of runtime performance estimators, determining, by the machine learning model, an accuracy parameter associated with the predicted performance, each of the accuracy parameters based on a relative accuracy among the plurality of runtime performance estimators.

12. The apparatus of claim 8, wherein the at least one processor is further configured to:
receive feedback data associated with the predicted performance using the preferred runtime performance estimator, wherein the feedback data includes an actual estimation cost and an actual estimation accuracy; and
tune the machine learning model based on the actual estimation cost and the actual estimation accuracy.

13. A non-transitory computer-readable storage medium having stored thereon instructions which, when executed by one or more processors, cause the one or more processors to:
receive at least one autonomous vehicle (AV) compute workload including a workload criticality level and a target hardware parameter, wherein the target hardware parameter identifies one or more hardware components configurable to execute the at least one AV compute workload;
identify a plurality of runtime performance estimators for obtaining a predicted performance of the at least one AV compute workload on the one or more hardware components;
for each runtime performance estimator of the plurality of runtime performance estimators:
determine, based on a machine learning model, a respective safety degradation metric by applying the runtime performance estimator to a test set of AV operational scenarios and comparing results against safety thresholds associated with the workload criticality level; and
calculate, based on the machine learning model, a cost function value based on the respective safety degradation metric; and
select, based on the machine learning model, a preferred runtime performance estimator from the plurality of runtime performance estimators that optimizes the cost function value for obtaining the predicted performance of the at least one AV compute workload using the one or more hardware components.

14. The non-transitory computer-readable storage medium of claim 13, wherein the at least one AV compute workload includes at least one of a perception stack component, a prediction stack component, a planning stack component, and a control stack component.

* * * * *